May 15, 1956  R. H. BERG  2,745,293
LEVER CONTROL MECHANISM
Filed Dec. 17, 1954  7 Sheets-Sheet 1

Fig. 1.

INVENTOR
Robert H. Berg
BY Ernest V. Haines
ATTORNEY

May 15, 1956　　　R. H. BERG　　　2,745,293
LEVER CONTROL MECHANISM

Filed Dec. 17, 1954　　　7 Sheets-Sheet 2

Fig. 2.

INVENTOR
Robert H. Berg

BY Ernest V. Haines
ATTORNEY

May 15, 1956  R. H. BERG  2,745,293
LEVER CONTROL MECHANISM
Filed Dec. 17, 1954  7 Sheets-Sheet 3

Fig. 3.

INVENTOR
*Robert H. Berg*
BY *Ernest V. Haines*
ATTORNEY

May 15, 1956 R. H. BERG 2,745,293
LEVER CONTROL MECHANISM
Filed Dec. 17, 1954 7 Sheets-Sheet 4

INVENTOR
Robert H. Berg
BY Ernest V. Haines
ATTORNEY

United States Patent Office 2,745,293
Patented May 15, 1956

2,745,293

LEVER CONTROL MECHANISM

Robert H. Berg, Elmhurst, Ill., assignor to International Minerals & Chemical Corporation, a corporation of New York Application December 17, 1954, Serial No. 475,996

12 Claims. (Cl. 74—471)

This invention is directed to a universally mounted control lever system operable to effect independent or simultaneous actuation of a pair of control devices in accordance with the direction of movement of the control lever.

The lever control mechanism of the instant invention has been developed for and finds particular utility in the control system of a dragline. The invention will be described in this application in connection with a dragline control system. However, it will be readily recognized, from the specific description of the illustrated embodiment as given hereinafter, that the lever control mechanism is suitable for use in a variety of machines such as land, sea or air vehicles and other machines having a working member movable in two or three dimensions in space.

As applied to a dragline control system, the lever control mechanism of this invention has not only simplified and improved dragline operation but also in combination with this mechanism several other notable advances have been made in the construction and arrangement of the dragline cab toward achieving maximum dragline operating efficiency. To provide healthful operating conditions and maximum comfort to the dragline operator, the dragline cab has been completely enclosed with large observation windows to offer the maximum unobstructed view to the operator. The enclosed cab has been air-conditioned and glare reducing shades provided to minimize eye strain of the operator. Further, a comfortable contour padded seat has been provided in the dragline cab so that the operator may run the dragline for long stretches without undue physical fatigue.

To reduce the physical effort and thus minimize body fatigue in operation of the dragline, the old-fashioned long control levers pivoted as far away as the cab floor are replaced by short easily movable levers mounted on pedestals adjacent the seat of the dragline operator. Also, the foot pedals customarily employed in excavators have been dispensed with and the number of control levers reduced by combining two operations and their regulation into a single control lever.

The result of these advances in the perfection of the dragline cab and control has proven in operation to effect a material increase in the operator's production and, further, by reason of the more healthful operating conditions, fewer man hours lost due to illness.

For use in the perfected dragline cab, as discussed hereinabove, or in machines inherently concerned with movement of a working member in a plurality of directions, the control lever mechanism, which is connected to effect actuation of a pair of control devices, must possess certain features to be acceptable. Initially, the hand lever must be universally mounted so that movements thereof from a central neutral point in mutually perpendicular planes will effect independent actuation of the two respective control devices. The locus of all positions of the outer end of this universally mounted control lever is a spherical surface. Thus, more specifically, independent actuation of one of the control devices must result when the outer end of the control lever moves along one of a first family of great circles of the spherical surface wherein said first family of great circles are related by having a common diameter which intersects the pivot point for the universally mounted control lever and lies in one of the above referred to mutually perpendicular planes. Likewise, independent actuation of the other of the control devices must result when the outer end of the control lever is moved along one of a second family of great circles of the spherical surface wherein said second family of great circles are related by having a common diameter which intersects the pivot point for the universally mounted control lever, lies in the other of the above referred to mutually perpendicular planes and is perpendicular to the common diameter of the above referred to first family of great circles.

As an example of the above, a lever controlling the hoist and swing functions of a dragline would control raising and lowering of the drag bucket by movements respectively backward and forward in relation to the dragline operator and control right and left swing of the dragline by movements to the right and left respectively with relation to the operator. Since in operation it may be necessary to perform the hoisting or swinging independently of the functioning of the other operation, the control lever must be able to effect actuation of the proper control device completely independent of any actuating movements imparted to the other control device.

Likewise, for fast efficient machine operation the machine operator must be able to effect simultaneous operation of, for example, the hoist and swing operations of a dragline. Also, the operator must be able to switch the hand lever directly from one position where both control devices have been actuated to another hand lever position whereat one or both of the control devices have been actuated to a different degree or in a different direction from that existing at said one position. For such operations the outer end of the universally mounted control lever would be moved to positions disposed intermediate the central great circles of the above refered to families. For the control lever mechanism to be satisfactory, it must be possible to move the lever into all possible positions for actuation of the devices with complete ease and without any binding action in the mechanism which supports the lever.

For precision actuation of the machine controls, the universally mounted lever mechanism must be so constructed as to have little or no backlash and be simple to lubricate, so that very little if any wear will take place in the mechanism such as would produce undesired backlash or free play over an extended period of use. Finally, the mounting for the lever must enable the exclusion of dust, dirt and other foreign material from the lever mounting parts so that the structure will have a long life expectancy.

Having the above discussed advantages in mind, it is a principal object of the present invention to provide an improved universally mounted control lever mechanism operable by lever movements to actuate a plurality of separate control devices either independently or simultaneously with complete ease of lever movement in all directions from a central neutral position.

It is a further object of this invention to provide a universally mounted control lever mechanism wherein lever movements are precisely transmitted to actuate the control devices with which it is coupled without backlash or free play in the movement transmitting parts.

It is an additional object of this invention to provide a lever control system for effecting simultaneous or independent actuation of a plurality of control devices which employs throughout its motion transmitting parts readily removable sleeve bearings or bushings to provide a structure which may be simply lubricated and in which any wear may be corrected by mere replacement of one or more of the bearings.

It is also an object of the instant invention to provide a fully enclosed lever control mechanism whereby dust, dirt and other foreign material which might cause wear of the parts is excluded from entering the mechanism.

The foregoing and other important objects and desirable features inherent in and encompassed by this invention will be brought out in detail in the following description of a preferred embodiment of the invention as illustrated in the accompanying drawings in which.

Figure 1:
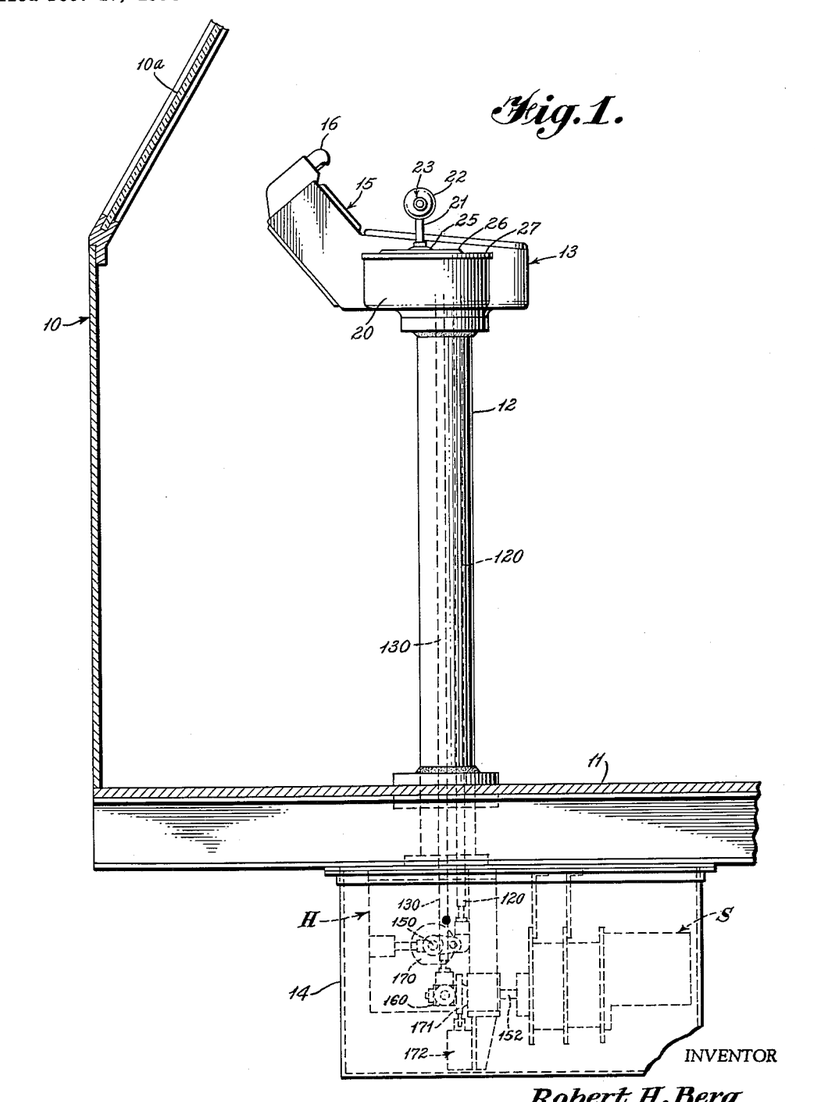
Figure 1 is a sectional view of a dragline cab showing the control lever of the instant invention mounted on a pedestal within the cab.

Referring more particularly to Figure 1 of the drawings, there is illustrated a portion of a dragline cab 10 having an observation window 10a and a floor 11 on which is mounted a tubular column 12 which, together with a housing 13, forms a pedestal for mounting and enclosing the parts of the hand lever control mechanism of the instant invention. Beneath the floor 11 there is mounted an enclosure 14 which houses two of the rheostats which are coupled to the motive power means for effecting the dragline operations. Further details concerning the functioning and structure of the rheostats and enclosure 14 will be described in detail hereinafter.

The housing 13 has mounted thereon dials 15 positioned so as to be readily viewable by the dragline operator seated in the cab during operation of the dragline. These dials indicate the load carried by the dragline bucket as measured by the armature current in the dragline hoisting motor and the depth of the drag bucket below the ground level, as measured by the length of the hoisting cable played out from the hoist drum. A suitable dial illuminating light 16 is provided on the housing 13 to facilitate reading of dials 15.

The pedestal illustrated on Figure 1 of the drawings represents the right hand control lever pedestal in that it carries the hand lever which is grasped by the dragline operator's right hand in effecting operation of the dragline. A similar pedestal (not shown) is mounted on the floor of the dragline cab to the left of the illustrated pedestal in relation to the operator facing observation window 10a. This second pedestal carries a second control lever which is grasped by the operator's left hand during operation of the dragline. By appropriate manipulation of these two control levers, the dragline operator can regulate the basic operating functions of the dragline, i. e., hoist, swing and drag. The hoist and swing functions are effected through manipulation of the right control lever which, as will appear from the description given hereinafter, is so constructed to enable simultaneous or independent regulation of these two functions. The drawing in and playing out of the drag cable is in turn effected by operation of the left control lever which for this purpose may be designed as a more or less conventional pivoted lever which is moved back and forth from a neutral position to control the winding in and out of the drag cable.

Further, in the specific embodiment illustrated on the drawings, the right and left hand control levers are connected by linkages to rheostats mounted below the floor of the cab. A separate rheostat is provided for each of the three dragline operations with each such rheostat controlling the speed and direction of rotation of an electric motor which effects the particular dragline operation. In other words, a separate motor is provided to control the hoist cable, the drag cable and right and left swing of the dragline about its vertical axis with each motor being regulated by a rheostat.

The housing 13 has a laterally protruding casing 20 which encloses the mounting elements of the right hand control lever 21. The casing 20 extending laterally outwardly from the tubular column 12 positions hand lever 21 for most convenient access to the dragline operator. Thus, the operator when seated in the cab facing observation window 10a is in a position such that the lever 21 is immediately in front of his right side for manipulation by his right hand.

As shown more clearly in Figures 3, 4, 5 and 6, it will be seen that the upper end of lever 21 is provided with a pear-shaped hand grip 22. This hand grip is so shaped to provide a comfortable grasp for the right hand of the dragline operator. A normally open pushbutton switch 23 is housed within the larger end of the grip 22 so as to be positioned for engagement by the thumb of the operator's right hand. The leads 24 from switch 23 extend downwardly through lever 21 and exit adjacent the base portion thereof to be connected with a solenoid counter (not shown) which, in the specific use of the invention described herein, is actuated by the operator at appropriate times to register each bucket load mined by the dragline.

A generally hemispherical shield 25 is secured adjacent the lower end of lever 21 and is engaged with an annular sealing ring 26 which is secured to the cover 27 of casing 20. The sealing ring 26, in slidably engaging with the hemispherical shield 25 excludes the entrance of foreign material into casing 20 and housing 13, while permitting universal movement of the lever 21 to actuate the devices which effect performance of the respective dragline functions.

At the opposite end of hand lever 21 from grip 22 there is provided a generally C-shaped base portion 30. A sleeve element 31 having bushings 32 is pivotally mounted within the recess of the base portion 30 on a pair of pins 33 carried in bores formed longitudinally through the flanges of the C-shaped base portion. A plate 34 is secured to the lower end of base portion 30 across the lower pin 33 to retain same in position. The sleeve 31 is cross bored intermediate the ends thereof and provided with a bearing 35 which pivotally engages with one end of a support member as described hereinbelow. A stub shaft 36 is provided extending laterally outwardly from the mid section of the C-shaped base portion 30 to pivotally engage with one end of another support member, as described in detail hereinafter.

A pair of support members designated generally at 40 and 41 are journalled on the base or bottom wall housing 13 and its casing 20 so as to be oscillatable about intersecting and mutually perpendicular axes. Thus, support member 40 extends outwardly from the base of the control lever in the form of a shaft 42 which is mounted in journals 43 having replaceable bearings or bushings 44. The axially aligned journals 43 are carried on a base 45 which is secured to the base of housing 13 by cap screws 46. The other end of support member 40 is offset at 47 to provide a crank arm or lever through which forces may be applied to effect oscillation of shaft 42. The outermost end of offset 47 carries a journal sleeve 48 having a removable bearing 49. The bearing 49 pivotally engages with stub shaft 36 and is held thereon by a C-spring washer 50 and a spacing washer 51.

A lever arm 52 is keyed to the outer end of shaft 42 so as to move in unison therewith and is held thereon by a C-spring washer 53. Arm 52 is provided with a clevis 54 at its outer end by means of which such arm is connected to one of the actuating rods extending downwardly through the tubular column which supports the pedestal on the dragline cab floor.

The second support member 41 has a bifurcated yoke 55 which carries at the outer end of the bifurcations a cross pin 56. This pin pivotally engages with the bearing 35 carried by sleeve 31 and is held in place on the yoke 55 by a pair of C-spring washers 57. It will be readily recognized that the bifurcations of yoke 55 form crank arms similar to offset 47 on support member 40. These crank arms provide for the application of forces to effect oscillation of support member 41.

Figure 4:
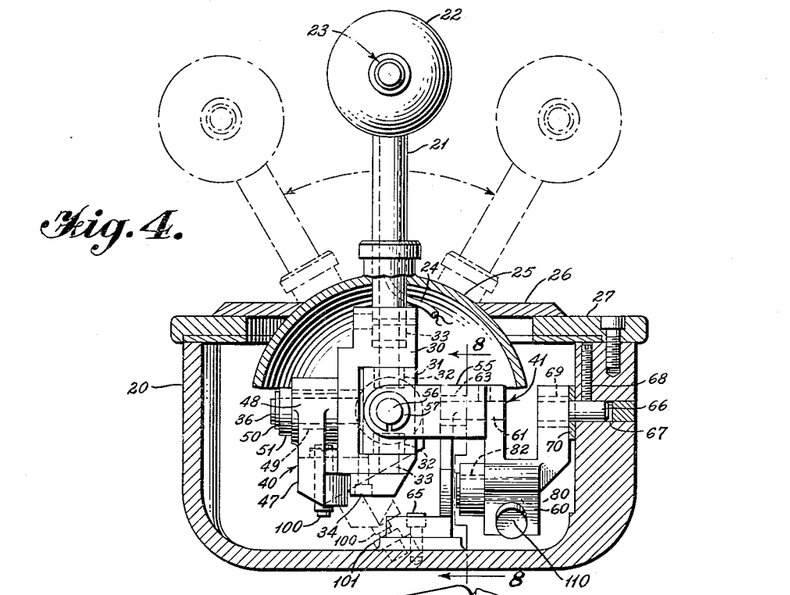
Figure 4 is a sectional view taken on line 4—4 of Figure 2.
Figure 5:
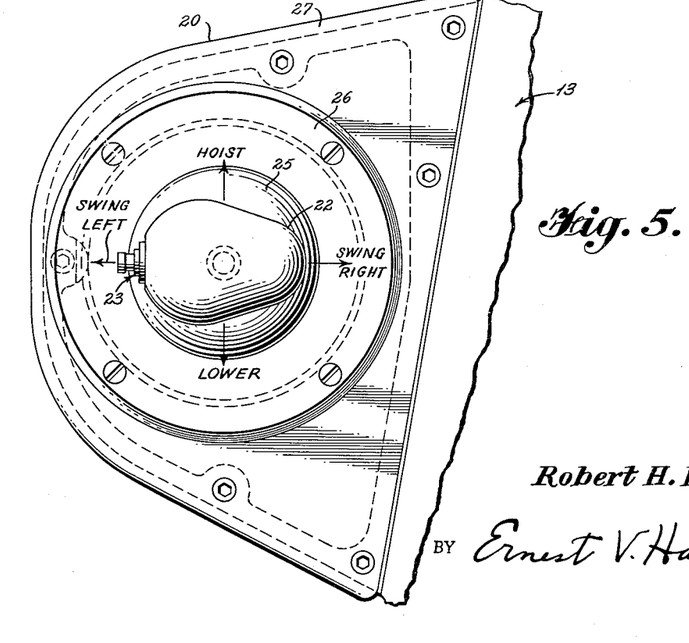
Figure 5 is a plan view of the hand lever and casing on which it is mounted.
Figures 6, 8:
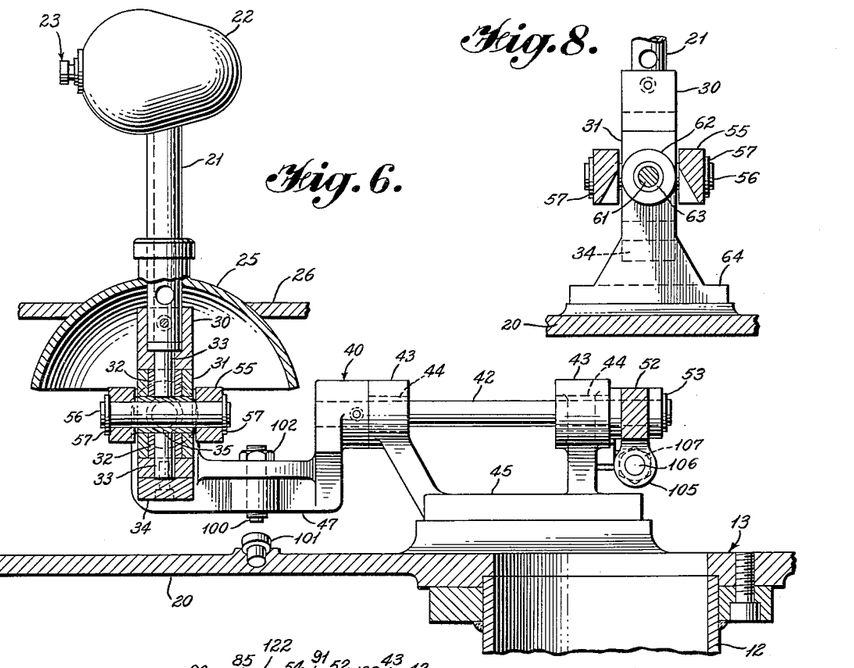
Figure 6 is a detailed sectional view taken on line 6—6 of Figure 2.
Figure 8 is a detailed sectional view taken on line 8—8 of Figure 4.
Figure 7:
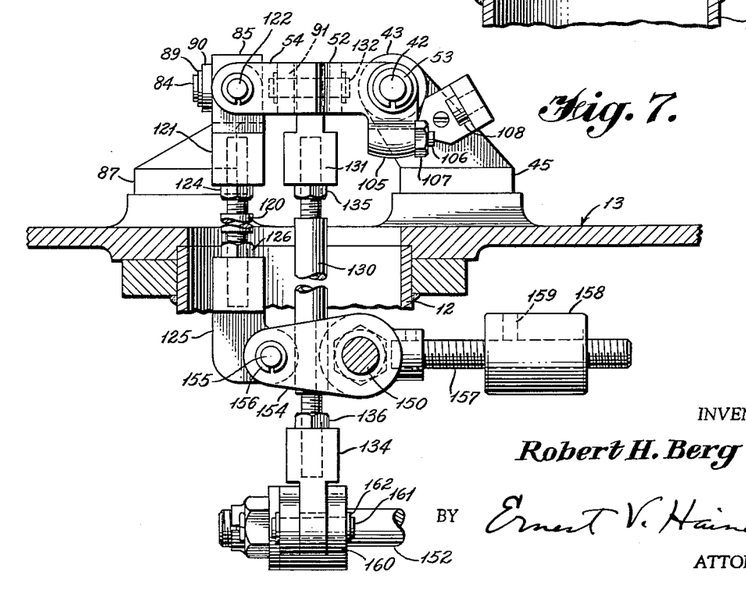
Figure 7 is a sectional view taken on line 7—7 of Figure 2.

The opposite end of support member 41 is provided with a lever arm 60. As is apparent from the view shown in Figure 4, the lever arm on member 41 is so disposed as to receive the outermost edge of hemispherical shield 25 when the control lever is moved rearwardly so as to not obstruct movement of the control lever. The web of yoke 55 is axially bored to support a pivot pin 61 which in turn cooperates with a support journal 62 having a removable bearing 63. Journal 62 is carried on a base 64 which is secured to the base of casing 20 by cap screws 65. A second journal for support member 41 is provided by a pivot pin 66 aligned with bearing 63 and secured in a bore 67 formed in the wall of casing 20. A set screw 68, as shown in Figure 4, serves to retain pin 66 in place. The pin 66 pivotally engages with a bearing 69 carried in the outer end of member 41 and aligned with the pivot pin 61. A spacing washer 70 is interposed between the outer end of member 41 and the inside wall of casing 20.

The outer end of lever arm 60 carries a pivot pin 80 extending laterally outwardly therefrom and pivotally engaging with one end of a link 81, having a removable bearing 82. The pin 80 has an enlarged diameter head which serves to retain the link 81 on pin 80.

The opposite end of link 81 is pivotally connected with one arm of a bell crank 83. The bell crank 83 is mounted on a pivot pin 84 engaged with a journal 85 having a removable bearing 86, with the journal 85 supported by a base 87 secured to the base of housing 13 by cap screws 88. Pin 84, and therefore bell crank 83, are held in position by a C-spring washer 89 and spacing washer 90 cooperating with the end of the pin. The other arm of bell crank 83 extends horizontally from the pivot axis and is provided with a clevis 91 by means of which the bell crank is connected with one of the actuating rods extending downwardly through the tubular column which supports the pedestal on the dragline cab floor.

From the structure described hereinabove, it will be apparent that movement of control lever 21 in a forward or backward direction to effect hoisting or lowering of the dragline bucket (see Figure 5) will result in the base portion 30 pivoting about pin 56 while imparting movement to support member 40 through stub shaft 36, bearing 49, offset 47 and thus oscillating shaft 42 to cause corresponding movement of lever arm 52. Similarly, movement of control lever 21 from side to side to effect right and left swing of the dragline (see Figure 5) will result in the base portion 30 pivoting about stub shaft 36 while transmitting movement to support member 41 through pin 56, yoke 55, and thence through lever arm 60, link 81 and bell crank 83 to effect corresponding movement of the device actuating rod connected to the outer end of the horizontal arm of the bell crank. In each of these operations, wherein lever movement is effected in either of two mutually perpendicular planes, it will be appreciated that movement of the actuating parts is independent. Thus, forward and backward movement of the control lever has no effect toward moving the swing control parts and similarly movement of the control lever from side to side causes no movement of the hoist actuating parts.

It will also be appreciated that where it is desired to produce simultaneous actuation of the two referred to dragline functions, the control lever may be moved diagonally in any direction without encountering any increased resistance or binding of the parts. Such diagonal movement will cause partial actuation of each of the two devices being regulated. In this diagonal movement of the control lever the pivotal interconnection between sleeve 31 and base portion 30 permits the parts to adjust to the changes in their angular relation caused by movement of the hand lever diagonally from its neutral vertical position. In this respect, it is to be pointed out that all of the pivot axes on the support members, sleeve and base portion of the control lever intersect at a single common point, and that the arrangement of the pivotal connections provides a universally mounted hand lever which is substantially kinetically and geometrically perfect.

To limit the extent of movement possible for the hand lever, various adjustable stop means are provided in the mechanism. To limit forward movement of lever 21 which, as discussed herein, effects hoisting of the dragline bucket, a stud 100 is threaded through offset 47 on support member 40 and a stop 101 provided in the base of the casing 20 to be engaged by the lower end of stud 100. A lock nut 102 is provided on stud 100 so that upon desired adjustment of the stud such stud may be locked in position on support member 40. To determine the maximum extent of rearward movement of lever 21 which, as discussed herein, effects lowering of the dragline bucket, an extension 105 is provided on crank arm 52. A stud 106 is threaded into extension 105 and is provided with a lock nut 107. A stop 108 is secured to the base 45 for journals 43 so that upon rearward movement of the lever 21, stud 106 will engage with stop 108 and thereby preclude further movement of the control lever. As in the case of stud 100, stud 106 may be threaded into or out of extension 105 to the desired degree and then locked in this position by nut 107.

Figure 2:
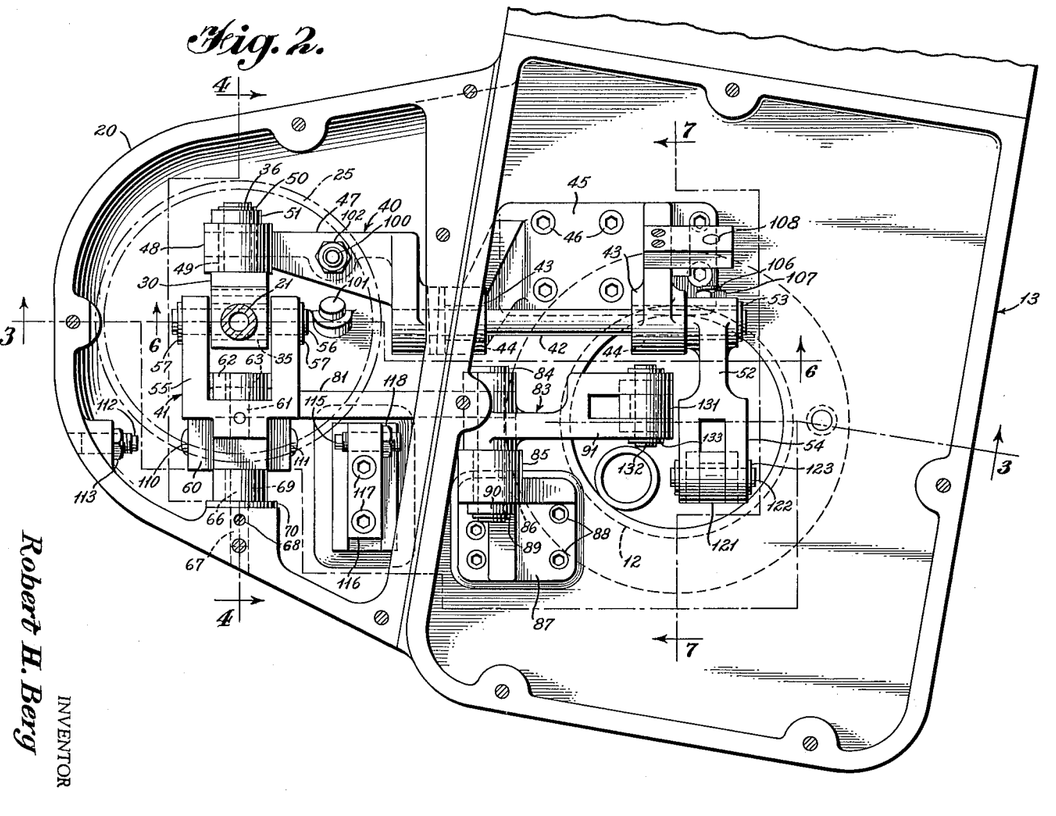
Figure 2 is a plan view illustrating the control lever mechanism of the instant invention with the mechanism cover removed and the hand lever shown in section.
Figure 3:
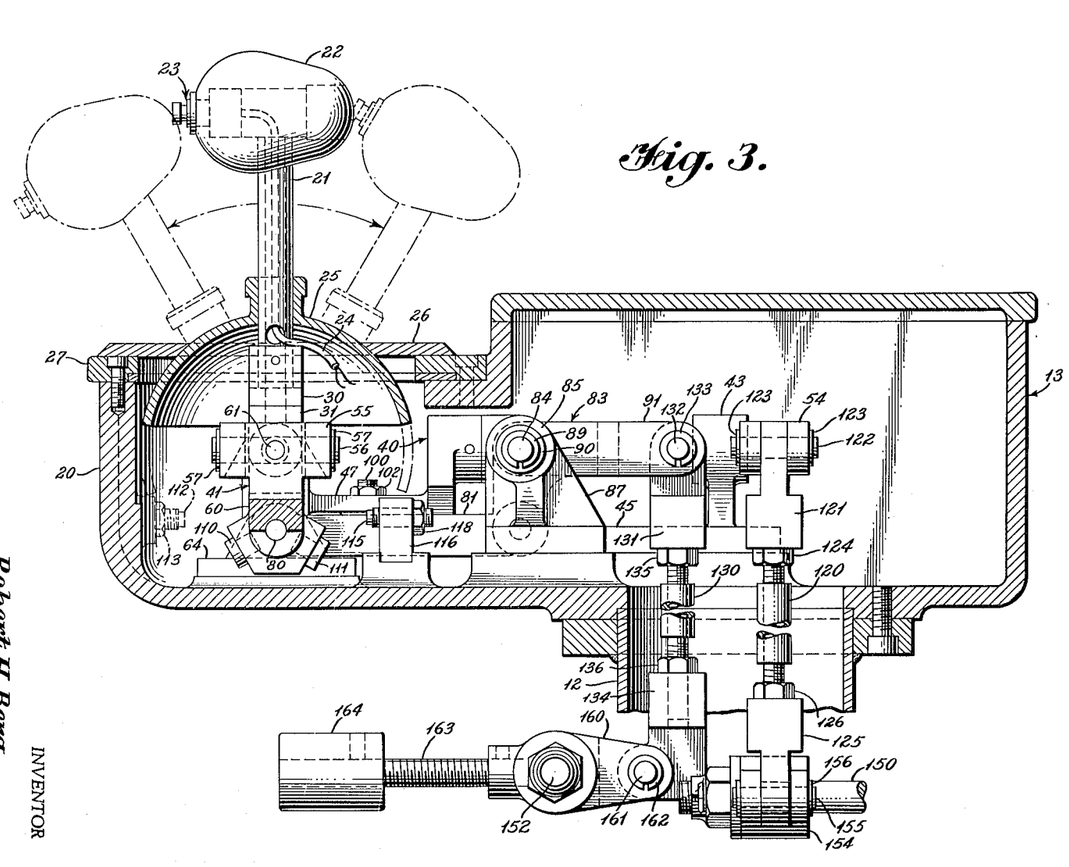
Figure 3 is a sectional view taken on line 3—3 of Figure 2.

To restrict the degree of lateral movement of the control lever 21 which in the illustrated application controls right and left swing of the dragline (see Figure 5) the lowermost end of lever arm 60 on support member 41 is provided with a pair of oppositely directed stops 110 and 111. A stud 112 is threaded into a bore formed in the wall of casing 20 and is provided with a lock nut 113 to enable securing of the stud in its desired position. Upon rightward movement of the control lever as viewed in Figures 2 and 3, stop 110 will engage with the outer end of stud 112 to limit such movement. A stud 115 is threaded into a support 116 secured to the base of casing 20 by cap screws 117. A lock nut 118 is threaded onto stud 115 to permit securing of the stud in its desired position. Stop 111 upon leftward movement of the control lever, as viewed in Figures 2 and 3 engages the outer end of stud 115 to limit such movement.

As noted hereinabove, the movements of control lever 21 are to be transmitted to rheostats for controlling respectively the hoist and swing of the dragline. The two rheostats which are connected into the speed and direction regulating circuits of the hoist and swing motors are mounted in enclosure 14, secured to the under side of floor 11, as shown in Figure 1.

To transmit the movements of the control lever 21 downwardly to the rheostats in enclosure 14 a reach rod 120 is connected to clevis 54 by an apertured connector 121, coupled to the clevis by a pin 122. The pin 122 is held in place by C-spring washers 123. Rod 120 is threadably coupled to connector 121 with a lock nut 124 provided so that once the desired adjustment of the rod length has been achieved, the lock nut may be threaded against the end of connector 121 to fix the length of this connecting part. A connector 125 is threadably connected at the lower end of rod 120 with a lock nut 126 being provided to secure connector 125 in place on the lower end of rod 120.

A reach rod 130, similar to rod 120, is coupled by a connector 131 to clevis 91 by means of a pin 132 held in place by C-spring washers 133. A connector 134 is mounted on the lower end of rod 130 and lock nuts 135 and 136 provided between rod 130 and connectors 131 and 134 respectively to permit adjusting the length of this connecting part.

Figure 9:
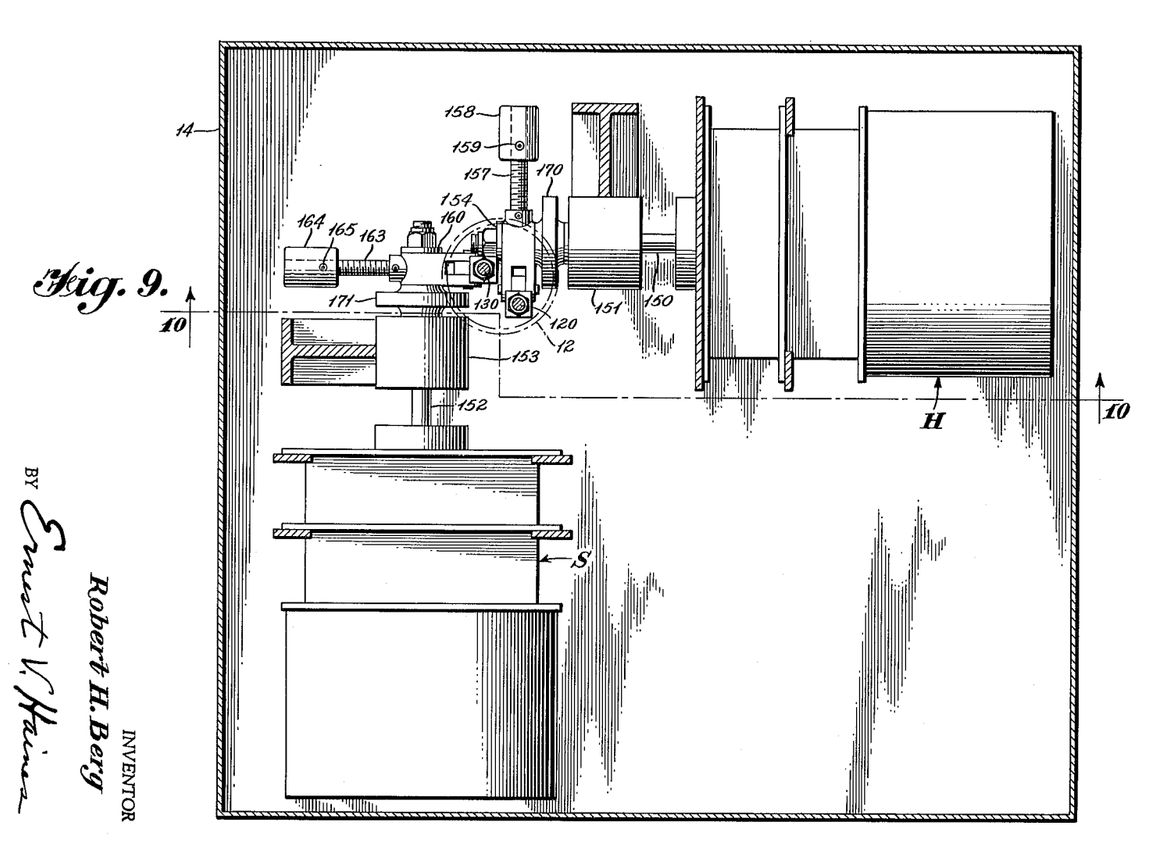
Figure 9 is a sectional plan view showing the dragline control rheostats mounted beneath the floor of the dragline cab.

Within the enclosure 14 there are mounted, suspended from the under side of the cab floor, the hoist rheostat H and the swing rheostat S. As referred to hereinabove, these two rheostats are respectively coupled into the regulating circuits of the hoist motor which raises and lowers the dragline bucket and the swing motor which effects right and left swing of the dragline about its vertical axis. As shown more clearly in Figure 9, the two rheostats are mounted with their axes mutually perpendicular to one another. Thus, the actuating shaft 150 of rheostat H is journalled in a bearing 151 with the outer end thereof disposed adjacent to and beneath the lower end of tubular column 12. Similarly, the operating shaft 152 of rheostat S is journalled in a bearing 153 with the outer end positioned adjacent the lower end of tubular column 12.

A lever arm 154 is keyed and bolted to the outer end of shaft 150 on rheostat H. The outer end of this lever arm is provided with a clevis and is coupled to connector 125 at the lower end of rod 120 through the medium of a pin 155 held in place by C-spring washers 156. A screw 157 extends outwardly in the opposite direction from lever arm 154 and has threaded thereon a counter balance weight 158. In assembling the mechanism for use, the weight 158 is threaded onto the screw 157 to a point where it substantially balances the weight of the various parts of the lever system. A set screw 159 is provided to enable securing the weight in proper location for balancing the mechanism.

A lever arm 160 is keyed and bolted into the outer end of shaft 152 on rheostat S. This lever arm is provided at its outer end with a clevis to which is coupled connector 134 by means of a pin 161 held in place by C-spring washers 162. A screw 163 is provided extending outwardly opposite lever arm 160 and carries thereon a counter balancing weight 164. A set screw 165 is provided in the weight 164 to engage screw 163 and hold the weight in position thereon, once it has been adjusted to balance the various elements in the portion of the system with which it is related.

It will thus be seen that movements of the mechanism, as created by shifting the control lever from its neutral point, will be transmitted independently or simultaneously downwardly through rods 120 and/or 130 to effect actuation of the rheostats S and H through lever arms 154 and 160 carried thereby. Further, it is noted that the counter balancing weights 158 and 164 enable offsetting forces created by the weight of the various parts in the lever control system which would tend to move the control lever from its neutral position. Thus, in moving lever 21 the operator does not have to apply an actuating force to overcome the weight of the parts in the system but only need apply sufficient force to operate the rheostats.

Figure 10:
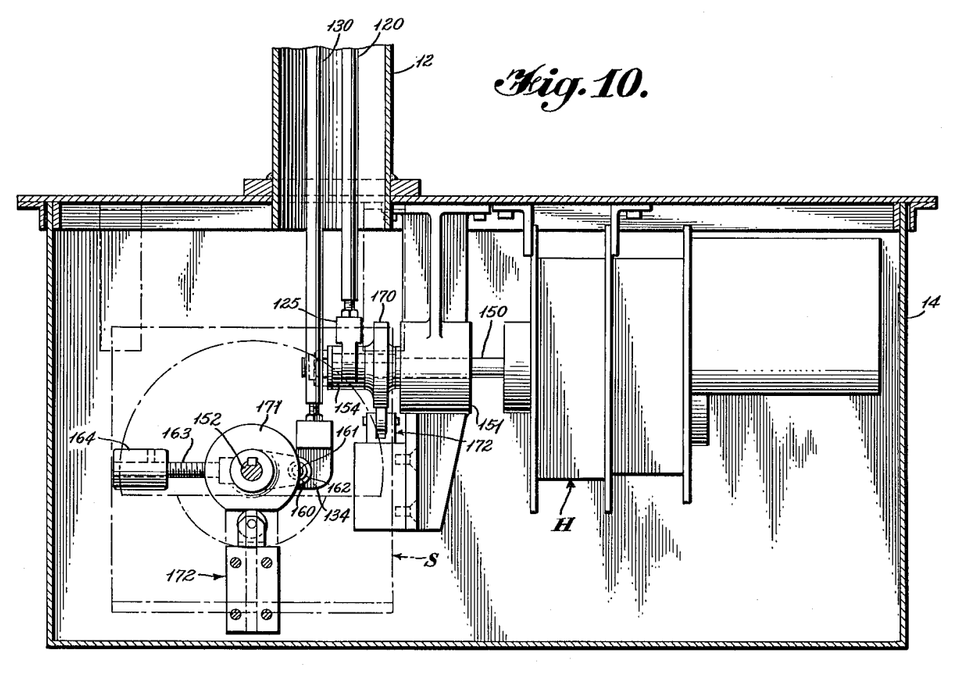
Figure 10 is a sectional view taken on line 10—10 of Figure 9.

In the embodiment as illustrated on the drawings no means has been shown to return the hand lever to its neutral vertical position. It will be readily recognized that, if desired, suitable spring biasing means may be connected to the various mechanism parts to urge such parts to return to a single stable position wherein lever 21 will be vertical. To provide an indication as to the neutral vertical position for the hand lever such that the operator can readily feel when the lever is in its neutral position, there are provided discs 170 and 171 mounted respectively on rheostat shafts 150 and 152. Each of these discs is provided with a flattened side and a spring pressed roller assembly is mounted beneath the respective discs. The roller carried by these assemblies is mounted on an element which is urged upwardly as shown in Figure 10 to force the roller into engagement with its related disc. The flat portion on each disc is so related to the roller that when the lever 21 is in its neutral vertical position the roller will be engaged with the flat portion of the disc. It will be readily recognized that any displacement of the discs 170 and 171 by movement of the hand lever on its carrying pedestal tends to displace the roller downwardly against its upward biasing spring and thus indicates by the force required to displace the lever 21 that such lever is being moved from its neutral position.

On the drawings and as described hereinabove, reference has been made to replaceable bearings or bushings at the various pivotal interconnections between the parts of the control lever mechanism. It will be readily recognized that within the scope of the instant invention these bearings may take the form of bronze or other Babbitt metal bushings or may be antifriction bearings such as needle bearings. It will also be recognized that although a preferred embodiment of the invention has been illustrated and described herein, other structures embodying the basic features of the instant invention are contemplated within the scope of the herein appended claims.

Having described my invention, what I claim is:

1. A control lever mechanism for actuating independently or simultaneously a pair of devices comprising a mounting for supporting a control lever, first and second support members pivotally mounted on said mounting with their pivotal axes intersecting, each of said support members having a crank arm for application thereto of forces tending to oscillate the support member about its pivotal axis, said crank arms being positioned adjacent one another but spaced laterally from the point of intersection of the pivotal axes of said support members, a control lever having a base portion positioned intermediate said crank arms and adjacent the point of intersection of the pivotal axes of said support members, an element pivotally mounted on said base portion and positioned at the point of intersection of the pivotal axes of the support members, means pivotally interconnecting said base member with the crank arm of said first support member, means pivotally interconnecting said element with the crank arm of said second support member, the pivot axes of said element and said pivotally interconnecting means intersecting at the point of intersection of the pivotal axes of said support members, and means connected to each of said support members for transmitting oscillations thereof to the devices to be actuated.

2. A control lever mechanism as recited in claim 1 wherein said last named means includes a lever arm carried by each of said support members and a reciprocable rod member connected to the outer end of each lever arm to translate oscillations of said support members into reciprocating movements in the rod members for actuating the devices.

3. A control lever mechanism for actuating independently or simultaneously a pair of devices comprising a control lever having a hand grip and a base portion, a sleeve element pivotally mounted on said base portion, a first support member journalled for pivotal movement and having a crank arm carrying bearing means radially offset from the pivot axis of said first support member and pivotally interconnecting said base portion to said first support member, a second support member journalled for pivotal movement about an axis intersecting the first support member pivot axis, said second support member having a bifurcated yoke at one end thereof to provide a pair of crank arms disposed on opposite sides of and radially offset from the pivot axis of said second support member, bearing means carried by the bifurcations and pivotally interconnecting said sleeve element to said second support member, the pivot axes of said sleeve element and bearing means intersecting at the point of intersection of the pivot axes of said support members, a lever arm carried by each of said support members, and means connecting said lever arms with the respective devices to be actuated whereby oscillation of said support members as created by movements of the control lever supported thereon will be transmitted to the devices to be actuated.

4. A control lever mechanism for actuating independently or simultaneously a pair of devices comprising a mounting for a control lever, a control lever having a hand grip and a generally C-shaped base portion, a sleeve element pivotally mounted within the recess of said C-shaped base portion, said sleeve element having bearing means with the pivot axis thereof intersecting the pivotal axis of said sleeve element, second bearing means carried by the mid section of said C-shaped base portion and providing a pivot axis intersecting the pivot axis of said sleeve element at its point of intersection with the pivot axis of the element bearing means, a pair of support members journalled on said mounting with their pivotal axes intersecting one another at the point of intersection of the pivot axes of the sleeve element and bearing means, each of said support members having a crank arm for application thereto of forces tending to oscillate the support member about its pivot axis, the crank arm on one of said support members being pivotally connected to the bearing means on said sleeve element, the crank arm on the other of said support members being pivotally connected to the bearing means on the mid section of said C-shaped base portion, a lever arm rigidly secured to each of said support members to extend radially outwardly of its journal axis, and means for connecting each said lever arm to a device to be actuated.

5. A control lever mechanism for actuating independently or simultaneously a pair of devices comprising a mounting for a control lever, a control lever having a hand grip and a generally C-shaped base portion, a pair of axially aligned pivot pins carried respectively in the upper and lower sections of said base portion and extending inwardly of the recess of said C-shaped base portion, a sleeve element pivotally mounted on said pins and having a cross bore carrying a bearing, a stub shaft extending outwardly from the mid section of said C-shaped base portion, a first support member pivotally mounted on said mounting and having a crank arm with an outer end carrying a bearing radially offset from the pivot axis of said first support member, said stub shaft being pivotally engaged with the bearing carried by the crank arm of said first support member, a second support member pivotally mounted on said mounting with the pivot axis thereof intersecting the pivot axis of said first support member and having a bifurcated yoke at one end thereof to provide a pair of crank arms disposed on opposite sides of and radially offset from the pivot axis of said second support member, a cross pin extending between the ends of the crank arms of said yoke and pivotally engaging with the bearing in the cross bore of said sleeve element, the pivot axes of said sleeve element and bearings intersecting at the point of intersection of the pivot axes of said support members, a lever arm carried by each of said support members, and means connecting said lever arms with the respective devices to be actuated whereby oscillation of said support members as created by movements of the control lever supported thereon will be transmitted to the devices to be actuated.

6. A control lever mechanism comprising a pedestal having a hollow supporting column communicating with a housing at the upper end thereof, said housing having wall means forming an enclosure for the parts of said mechanism with the top wall thereof having a circular opening therein, a control lever extending outwardly through said opening and having a hand grip at the outer end thereof, a generally hemispherical shield carried by said lever with the convex curvature thereof facing outwardly and engaging with the perimeter of said opening, means for universally mounting said control lever including a pair of support members pivotally mounted within said housing with their pivotal axes intersecting at a point disposed directly beneath said opening, each support member having a crank arm for application thereto of forces tending to oscillate the support member about its pivotal axis, said crank arms being disposed adjacent one another but spaced laterally from the point of intersection of the pivotal axes of said support members, a base portion carried by the lower end of said control lever positioned adjacent the point of intersection of the pivotal axes of the support members and intermediate said crank arms, an element pivotally mounted on said base portion and positioned at the point of intersection of the pivotal axes of said support members, means pivotally interconnecting said base portion with the crank arm of one of said support members, means pivotally interconnecting said element with the crank arm of the other of said support members, the pivot axes of said element and said pivotally interconnecting means intersecting at the point of intersection of the pivotal axes of said support members, and means connected to each of said support members for transmitting oscillations thereof to the devices to be actuated.

7. A control lever mechanism as recited in claim 6 wherein adjustable stop means are provided within said housing to limit movement of said control lever from a neutral vertical position.

8. A control lever mechanism as recited in claim 6 wherein said last-named means comprises a first lever arm carried by one of said support members and extending radially from the pivotal axis of such support member with the outer end thereof overlying the upper end of said hollow column, a second crank arm carried by the other of said support members, a bell crank pivotally mounted within said housing and having one arm thereof extending generally horizontally with the outer end thereof overlying the upper end of said hollow column, a link pivotally connected with said second crank arm and the other arm of said bell crank, and a pair of reach rods respectively connected to the outer end of said first crank arm and the outer end of said one bell crank arm whereby movements of said control lever wlil be transported into corresponding vertical reciprocation of said reach rods.

9. A control lever mechanism as recited in claim 8 wherein counterbalancing weight means are provided for offsetting the weight of the parts of the mechanism which would tend to displace the control lever from a vertical neutral position.

10. A control lever mechanism as recited in claim 8 wherein a pair of rheostats are mounted adjacent the lower end of the support column with a lever arm carried on the outer end of each rheostat actuating shaft, and the lower end of each reach rod is pivotally connected to the outer end of one of said lever arms.

11. A control lever mechanism as recited in claim 10 further having a neutral position indicator on each rheostat actuating shaft including a disc having a flattened side and a spring pressed roller engaging the periphery of said disc whereby engagement of said roller with the flattened side will indicate neutral position of the rheostat and lever.

12. A control lever mechanism comprising a pedestal including a housing carried on a hollow supporting column, said housing having a casing extending laterally outwardly therefrom, a cover secured to said casing and having a circular opening therein, a control lever extending outwardly through said opening and having a base portion positioned within said casing, a convexly curved shield carried by said control lever with the outer surface thereof engaging with the perimeter of said opening, said base portion having a sleeve element pivotally mounted in axial alignment with said control lever, said sleeve element having a cross bore carrying a bearing therein, a stub shaft extending laterally outwardly from said base portion, a first support member pivotally mounted within said housing and extending outwardly into said casing, said first support member having a crank arm disposed within said casing with an outer end carrying a bearing radially offset from the pivot axis of said first support member, said stub shaft being pivotally engaged with the bearing carried by the crank arm of said first support member, a second support member pivotally mounted within said casing with the pivot axis thereof intersecting the pivot axis of said first support member at a point centered beneath said opening, said second support member having a bifurcated yoke at one end thereof providing a pair of crank arms disposed on opposite sides of and radially offset from the pivot axis of said second support member, a cross pin extending between the ends of the crank arms of said yoke and pivotally engaging with the bearing in the cross bore of said sleeve element, the pivot axes of said sleeve element and bearings intersecting at the point of intersection of the pivot axes of said support members, a first lever arm carried by said first support member and extending generally horizontally with the outer end thereof overlying the upper end of said hollow column, a second lever arm extending downwardly from said second support member, a bell crank pivotally mounted within said housing with one arm thereof overlying the upper end of said hollow column, and a link connected between said second lever arm and the other arm of said bell crank.

References Cited in the file of this patent
UNITED STATES PATENTS

| | | |
|---|---|---|
| 1,169,898 | Wilcox | Feb. 1, 1916 |
| 1,541,712 | Horn | June 9, 1925 |
| 1,630,217 | Rasor | May 24, 1927 |
| 2,700,904 | Woods | Feb. 1, 1955 |